July 10, 1951              H. SINCLAIR              2,559,740
POWER-TRANSMISSION MECHANISM
Filed Sept. 14, 1948              4 Sheets-Sheet 1
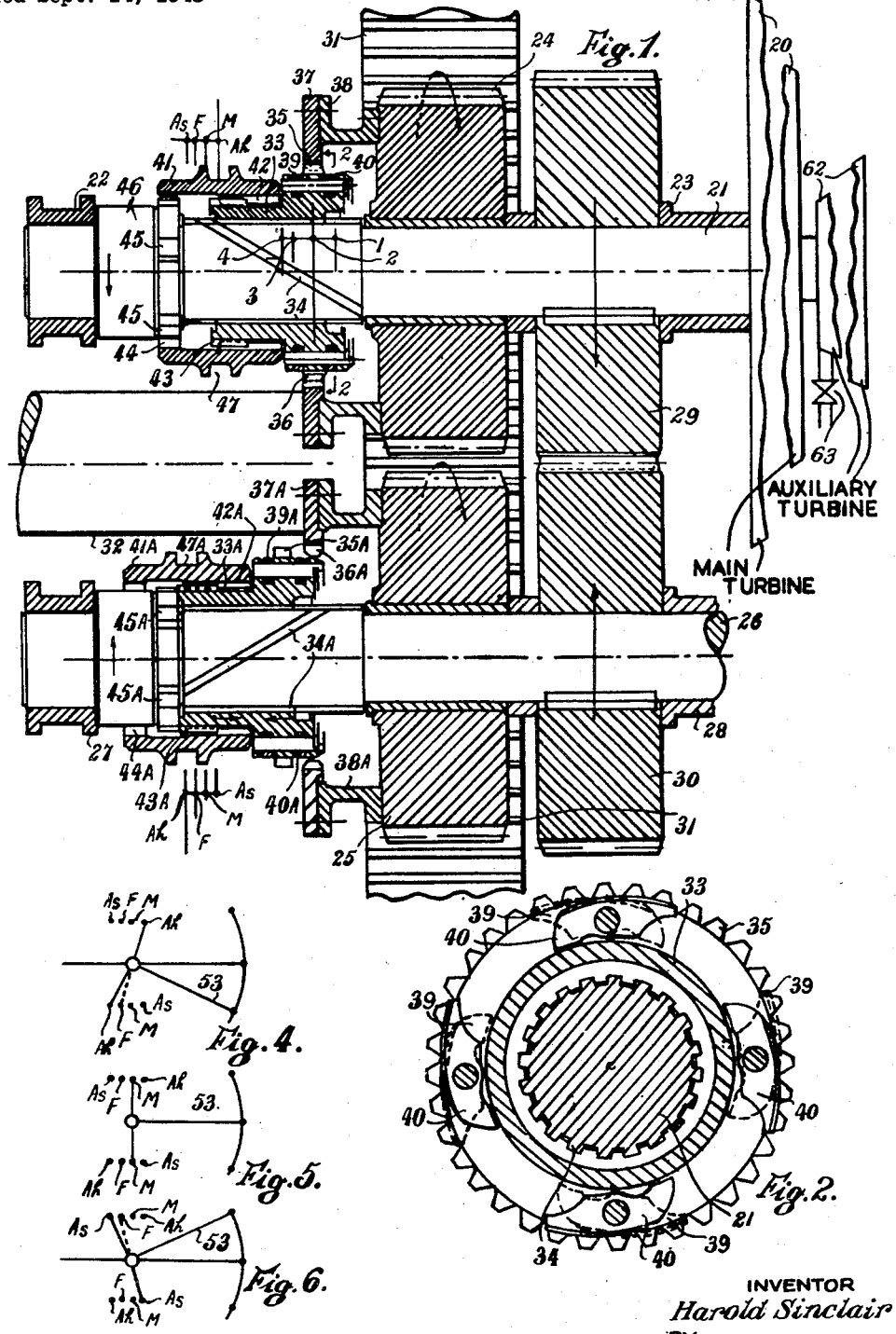
INVENTOR
*Harold Sinclair*
BY
ATTORNEYS July 10, 1951  H. SINCLAIR  2,559,740
POWER-TRANSMISSION MECHANISM
Filed Sept. 14, 1948  4 Sheets-Sheet 2

INVENTOR
*Harold Sinclair*
BY
ATTORNEYS

July 10, 1951  H. SINCLAIR  2,559,740
POWER-TRANSMISSION MECHANISM
Filed Sept. 14, 1948  4 Sheets-Sheet 3

INVENTOR
Harold Sinclair
BY
ATTORNEYS

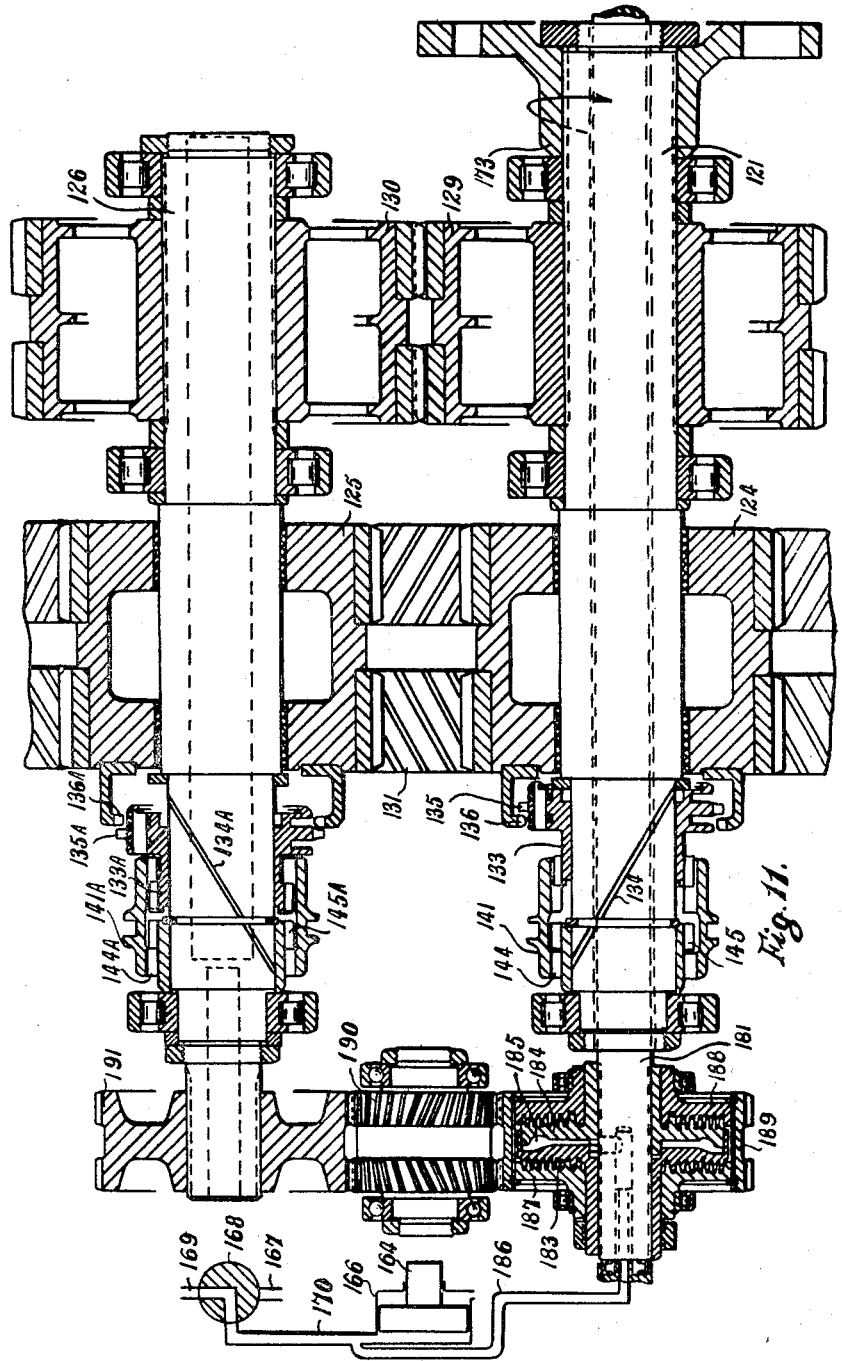

Patented July 10, 1951

2,559,740

UNITED STATES PATENT OFFICE 2,559,740

POWER-TRANSMISSION MECHANISM

Harold Sinclair, London, England

Application September 14, 1948, Serial No. 49,166
In Great Britain September 16, 1947

12 Claims. (Cl. 74—339)

1

This invention relates to power-transmission mechanism of the kind having a driving member which is capable of exerting substantial driving torque in only one direction of rotation, a driven member required to be driven alternatively in the forward and backward directions of rotation at will, and gearing providing in parallel between the driving and driven members a forward-drive power path and a reverse-drive power path, said paths having respectively selecting clutches operable for establishing the drives through them.

One object of this invention is to provide an improved arrangement of power-transmission mechanism of the kind hereinbefore specified, whereby the driven member, when connected to a load having a high inertia, can be easily braked by the application of countertorque derived from the driving member or whereby it can be driven in the reverse direction.

According to this invention, a power-transmission mechanism of the kind hereinbefore specified includes auxiliary driving means capable, while the driven member is running, and on disengagement of the engaged selecting clutch, of accelerating the driving member in the reverse direction to a speed sufficient to synchronise the selecting clutch that was not previously engaged.

When the auxiliary driving means have acted so to reverse the rotation of the driving member, the selecting clutch thereby synchronised is engaged and the auxiliary driving means are de-energised. The driven member can now be arrested, and if desired caused to rotate in the opposite direction by suitably regulating the torque applied by the driving member.

The driving member may be, for example, the shaft of a non-reversing elastic fluid turbine; the auxiliary driving means may be a separate motor, e. g. an auxiliary elastic fluid turbine normally rotating idly backwards and capable of being energised for running in its forward direction while it is being rotated backwards by the forward running driving member. In this case, the sequence of operations required to change the rotation of the driven shaft from forwards to backwards (or vice versa) consists in interrupting the supply of driving fluid to the main turbine and permitting or causing disengagement or preselecting for disengagement the forward-drive (or backward-drive) selecting clutch, thereafter energising the auxiliary drive prime mover which operates to arrest the main turbine and thereafter to accelerate it up to the speed necessary to synchronise the reverse-drive (or forward-drive) selecting clutch, the driven member of

2 which is kept in rotation by the inertia of the load on the system, next permitting or causing engagement of the reverse-drive (or forward-drive) selecting clutch and de-energising the auxiliary drive means, and finally re-admitting driving fluid to the main turbine so as to arrest its backward rotation and to cause it to accelerate in its driving direction while driving the driven shaft backwards (or forwards).

The foregoing statement that the driving member is capable of exerting substantial driving torque in only one direction of rotation is intended to exclude the shaft of a reversing steam turbine such as is ordinarily used for marine propulsion to develop not less than about one-half of the power of the main turbine. It is not, however, intended to exclude an arrangement in which the driving member is the shaft of an elastic fluid turbine and in which the auxiliary driving means consist of an elastic fluid turbine in the same casing as the main turbine. The distinction is that, in the known arrangement, the reversing turbine is able to perform a similar duty to the main turbine, e. g. propel a ship; whereas in the new arrangement in question the auxiliary turbine is required only to motor the main turbine and is therefore designed to give only a small fraction of the power of the latter.

In an alternative arrangement, where it is inconvenient to stop the prime mover, the driving member may be the driven part of a preferably controllable hydraulic turbo-coupling or a preferably controllable electric slip coupling the driving part of which is drivably connected to the prime mover, e. g. an elastic fluid turbine or a non-reversing reciprocating internal-combustion engine. In this case the auxiliary driving means may be a power take-off, including an auxiliary slipable coupling, from the prime mover arranged in parallel with the main hydraulic turbo-coupling or electric slip coupling. The sequence of operations required to change the rotation of the driven shaft from forwards to reverse (or vice versa) is generally as described in the foregoing and consists briefly in disengaging the main coupling (if controllable) while the turbine or engine is allowed to run substantially idly, thereafter engaging the auxiliary slipable coupling so that the driven part of the main coupling is arrested and then accelerated up to the speed necessary to synchronise the reverse-drive (or forward-drive) selecting clutch, the driven member of which is kept in rotation by the inertia of the load on the system, next engaging the reverse-drive (or forward-drive) clutch, and disengaging the auxiliary coupling, and finally progressively re-engaging the main slipable coupling (if controllable) while the power output of the turbine or engine is increased. If the main coupling is a hydraulic turbo-coupling, it need not be controllable provided it is of the kind wherein the torque-transmission capacity when the impeller and runner are forced to rotate by the full engagement of the auxiliary slipable coupling at approximately equal speeds in opposite directions is substantially less than the torque-transmission capacity when the runner is stalled.

The selecting clutches may be of the kind that is wholly incapable of coupling the driving and driven members under conditions such that there is substantial relative rotation between the clutch elements; thus for example the clutches may be of the synchro-self-shifting type or of the balked jaw type. Alternatively the selecting clutches may be of a type which is not adapted without prohibitive deterioration to couple the driving and driven members under conditions such that there is substantial relative rotation between the clutch elements; thus for example the clutches may be of the magnetically actuated friction type having a high loading per unit area of the friction surfaces and hence a small power-absorbing capacity.

The term "clutch of the synchro-self-shifting type" here means a mechanism having a first member which is provided with a set of jaw clutch teeth and which may be for example the driving member or the driven member of the mechanism, a second member, which may be the driven member or the driving member respectively, and which is rotatable relatively to the first member, an intermediate member which is provided with a set of jaw clutch teeth and which is drivably connected to the second member by means constraining the intermediate member to slide relatively to the first and second members into and out of meshing engagement with the first member on reversal of torque through the mechanism, and an auxiliary driving connection of the ratchet type including a pawl mounted on one of the first and intermediate members and adapted to co-operate with teeth on the other of these members when these members are disengaged, the pawl being operative to transmit torque in such a sense between the first and intermediate members that the second and intermediate members co-operate to cause the intermediate member to slide in the axial direction such that the sets of clutch teeth interengage cleanly under the registering action of the pawl. The second member may be a shaft provided with helical splines, the intermediate member having internal splines co-operating with the shaft splines, as described in U. S. patent specification No. 2,202,271. Alternatively the second member may be a helical-tooth gear wheel, the intermediate member, which is co-axial with the first member, including a helical-tooth gear wheel meshing with the first-mentioned gear wheel and provided with clutch teeth adapted to engage the clutch teeth on the first member, as described in U. S. patent specification No. 2,320,757. Where selecting couplings of the synchro-self-shifting type are used, preferably the element of each coupling that moves axially to engage the coupling jaws is capable of moving to either side of the engaged position and is provided with two sets of synchronising pawls which serve respectively to mesh the axially movable element cleanly when moved from the two sides respectively, the coupling also having a controllable stop member which can be operated to prevent the axially movable element from moving beyond the engaged position when the driving element of the coupling tends to rotate forwards relatively to its driven element. In order to avoid continuous ratcheting of the pawls of one of the synchro-self-shifting couplings while the other is transmitting the drive, preferably each of the said axially movable elements is capable of moving, in response to forward rotation of the driving element of the coupling relative to its driven element, to a disengaged position such that both sets of pawls are inoperative, and control means serve to shift the said axially movable elements from the said disengaged position to a position in which the appropriate set of pawls is operative.

Two embodiments of the invention will be described by way of example and with reference to the accompanying diagrammatic drawings, in which:

Fig. 1 is a plan, partly in section, of a marine power plant embodying an elastic fluid turbine, and suitable for use in combination with gas-generators as a source of power gas, capable of giving the necessary range of volume and pressure during all the operations of a reversing cycle in normal manoeuvring and in emergency conditions.

Fig. 2 is a section on the line 2—2 in Fig. 1.

Figs. 4, 5 and 6 are diagrams showing the relationship between a control lever in Fig. 3 and parts actuated by it.

Fig. 11 is a sectional plan of a marine reversing gearing suitable for use with an internal-combustion engine.

Figure 3:
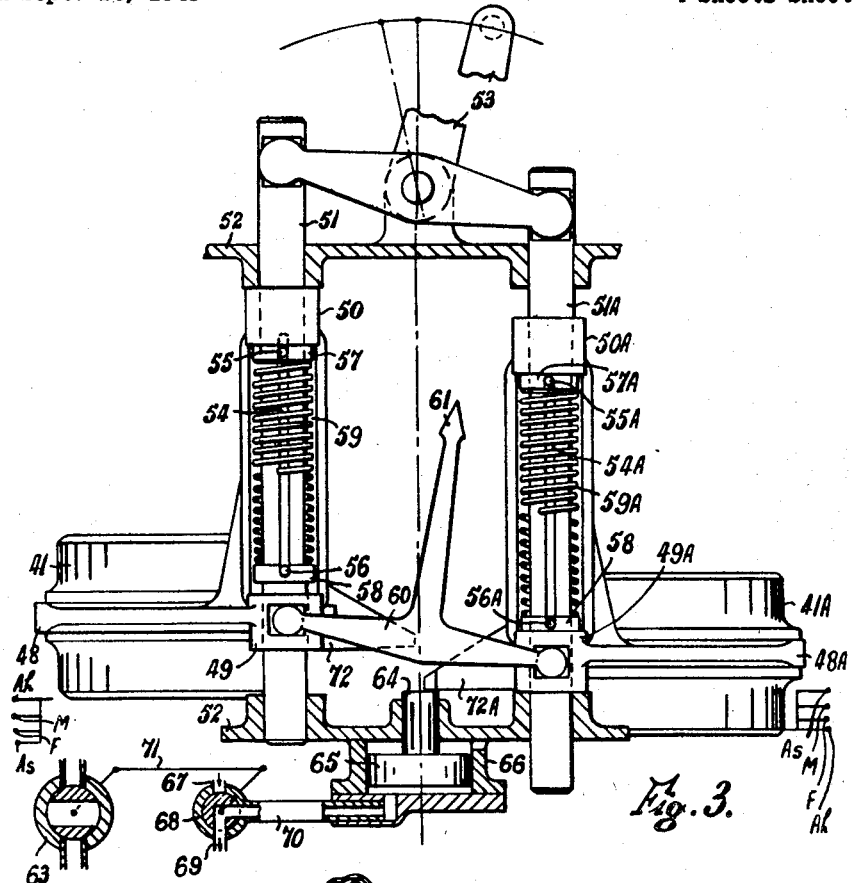
Fig. 3 is a plan of control mechanism for the reversing gear of the same plant.

In the marine turbine installation shown in Fig. 1, a main turbine 20 has its rotor coupled to a driving shaft 21 carried in bearings 22 and 23. The shaft 21 is the aforesaid driving member and on it is rotatably mounted an ahead pinion 24. An astern pinion 25 is rotatably mounted on a lay shaft 26 carried in bearings 27 and 28. Gear wheels 29 and 30 respectively fast on the shafts 21 and 26 and meshing together constrain these shafts to rotate at all times in opposite directions. The pinions 24 and 25 are in constant mesh with an output gear wheel 31 fast on the propeller shaft 32, which is the aforesaid driven member of the system.

The ahead pinion 24 can be clutched to the driving shaft 21 by a synchro-self-shifting coupling including an internally helically splined intermediate member 33 (hereinafter referred to as a nut) slidable on right-handed helical splines, indicated diagrammatically by 34, on the driving shaft 21 and having jaw clutch teeth 35 engageable with jaw-clutch teeth 36 on a ring 37 rigidly coupled to the pinion 24 by a tubular distance piece 38. The nut 33 can move axially from a first, limit position 1 in which its teeth 35 are on the right-hand side of the jaw-clutch teeth 36 on the pinion, through a second position 2 in which it appears in Fig. 1 and in which the jaw-clutch teeth 35 and 36 are in mesh, thence through a third position 3 in which the nut teeth 35 are on the other side of the pinion jaw-clutch teeth to a fourth limit position 4. Two sets of pawls 39 and 40 (Fig. 2) operate in known manner to register the jaw-clutch teeth 35 and 36 for clean engagement when the nut moves respectively from the first and third positions to the second position. When the nut is in the fourth position, the pawls 40 are to the left of the path of the teeth 36 and therefore inoperative.

A controllable stop member acting between the nut and the shaft can be operated to prevent the nut from passing beyond the second position, where its teeth 35 are in engagement with the jaw-clutch teeth 36 on the pinion, when moving from the first towards the third position. This stop consists of a control sleeve 41 having straight internal splines 42 slidably engaged wtih external splines 43 on the nut 33. Dogs 44 on the interior of the sleeve 41 co-operate with dogs 45 on a collar 46 rigid with the shaft 21. The control sleeve 41 has a circumferential groove 47 engaged by a yoke 48 (Fig. 3) coupled by preselector means to a control lever. These means include two spaced hollow bosses 49 and 50 rigid with the yoke 48 and slidable on a selector rod 51 which is in turn slidable in a gear case 52 by means of the control lever 53. The selector rod 51 has a longitudinal diametrical slot 54 through which pass pins 55 and 56 fast respectively in collars 57 and 58 slidable on the rod 51 between the bosses 49 and 50. A helical compression spring 59 urges the collars 57 and 58 apart.

The astern pinion 25 (Fig. 1) can be clutched to the lay shaft 26 by a synchro-self-shifting coupling similar to that on the driving shaft 21, except that its nut runs on left-handed splines and that the directions in which its pawls face are reversed. Parts of the astern coupling corresponding to those of the ahead coupling are denoted by the same reference numerals, followed by the reference letter A. The control sleeve 41A of the astern coupling is coupled to the abovementioned control lever 53 by preselector means similar to those for the ahead control sleeve and denoted by the same reference numerals followed by the reference letter A. The bosses 49 and 49A are connected by a floating lever 60 fitted with an indicator pointer 61 which follows up the movement of the control lever 53 when the control sleeves have executed their preselected axial displacements.

The control sleeves have four positions of axial displacement. In Figs. 1 and 3 the ahead control sleeve 41 appears in the "ahead" position denoted by A$h$. It can be shifted to the left (Fig. 1) from this position through a midposition M and a free position F to an "astern" position A$s$. The astern control sleeve 41A appears in Figs. 1 and 3 in the "ahead" position A$h$ and can be shifted to the right (Fig. 1) from this position through the free position F and the midposition M to the astern position A$s$. Figs. 4 to 6 show diagrammatically the relative positions of the control lever 53 and the control sleeves after the preselector means have operated. From Fig. 5 it is apparent that, when the control lever is in its midposition, both control sleeves are in their midpositions M. When the control lever is in the ahead position as in Fig. 4, both control sleeves are in position A$h$, and the spring coupling of the ahead preselector means is strained as shown in Fig. 3. Likewise, when the control lever is in the astern position as in Fig. 6, both control sleeves are in position A$s$, and the spring coupling of the astern preselector means is strained.

An auxiliary turbine 62 (Fig. 1) is connected positively to the driving shaft 21 and provided with a stop valve 63 for controlling the supply of working fluid to it.

A movable abutment member is arranged to prevent the control sleeves 41 and 41A from moving to the left (Fig. 1) beyond the free position F so long as the valve 63 is open. As shown diagrammatically in Fig. 3, this abutment, denoted by 64, is a plunger rigid with a piston 65 slidable in a cylinder 66 of a fluid pressure motor. A source of fluid under pressure is connected to a supply port 67 of a control valve 68 having an outlet port 69 and a connection 70 to the cylinder 66. The valves 63 and 68 are coupled by a system 71 in such a manner that, when the valve 63 is closed, as shown, the cylinder 66 communicates with the outlet port 69, and that, when the valve 63 is open, the cylinder 66 communicates with the supply port 67 and the piston 65 and the abutment 64 are forced outwards. Lugs 72 and 72A on the yokes 48 and 48A co-operate with the abutment 64 when the latter is moved outwards to prevent the control sleeves 41 and 41A from moving respectively towards the positions A$s$ and A$h$ beyond the positions F.

Figure 7:
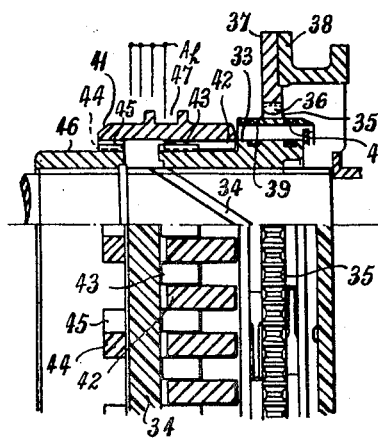
Figs. 7, 8, 9 and 10 are diagrams illustrating the operation of a synchro-self-shifting coupling forming part of the same plant, the upper part of each of these figures being a sectional elevation of one half of the coupling and the lower part a developed view showing control dogs.

Operation of the mechanism will be explained by imagining that the ship is moving ahead under power, the control mechanism being in the position in which it appears in Figs. 1, 3 and 4. The forward direction of rotation of the mechanism is indicated by arrows in Fig. 1. Under these conditions the dogs 45 are in driving engagement with the dogs 44 in the control sleeve 41, as shown in Fig. 7, so that the nut 33 is prevented from moving to the left beyond position 2 along the helical splines 34; its teeth 35 are therefore kept in engagement with the jaw clutch teeth 36 of the ahead pinion. The dogs 45A are axially spaced from the dogs 44A in the control sleeve 41A, so that the nut 33A is free to move on the helical splines 34A, though it remains in the position 4 shown, in which the pawls 40A are spaced to the left of the teeth 36A and therefore do not ratchet over these teeth.

Figure 8:
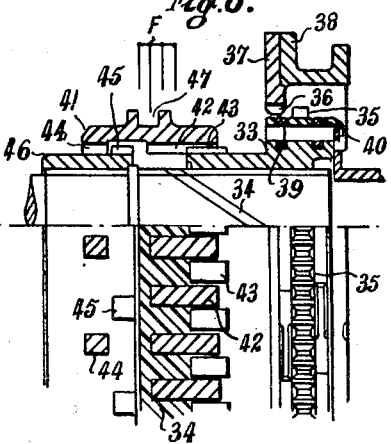

If now it is required to change the drive from ahead to astern, the supply of driving fluid is cut off from the main turbine 20 and applied to the auxiliary turbine 62 and the control lever 53 is moved from the ahead position to the astern position. The operation of the valve control system 71 (Fig. 3) causes the abutment 64 to be moved outwards. The slowing down of the turbine shaft 21 relatively to the ahead pinion 24, which is kept rotating by the way on the ship, cause the ahead coupling nut 33 to move to its first position (Fig. 8), and the removal of torque load from the dogs 44 of the control sleeve 41 allows this sleeve to be shifted by the preselector spring 59 to position F in which it is arrested by engagement of the lug 72 with the abutment 64. The astern control sleeve 41A is shifted by its preselector spring 59A (or by the abutment 64, depending on which operates first) to position F, its front end engaging the flange portion of the nut 33A and moving it along the splines 34A to its third position in which the pawls 40A ratchet over the jaw clutch teeth 36A of the astern pinion. Further shifting of the control sleeve 41A is prevented by engagement of the front faces of its dogs 44A with the rear faces of the dogs 45A.

Figure 9:
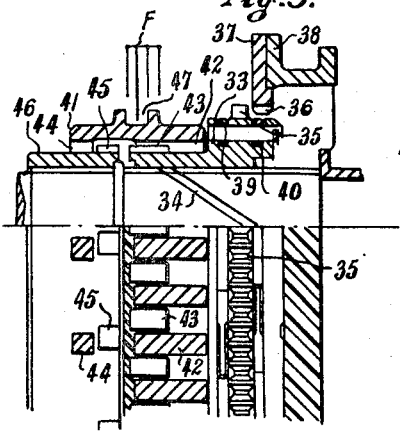
Figure 10:
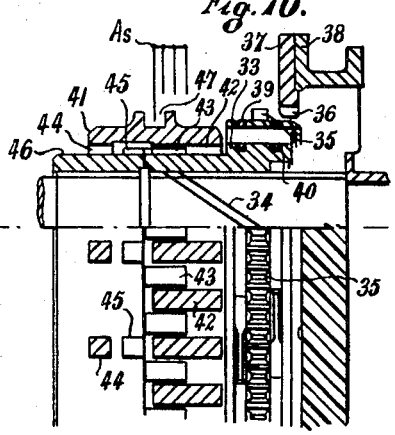

The auxiliary turbine 62 thereafter reverses the rotation of the main turbine, and when the turbines have accelerated in the reverse direction to a speed sufficient to synchronise the astern coupling, the pawls 40A will engage teeth 36A and cause the nut 33A to move along the splines to its first position. This movement of the nut helically on the shaft 26 causes the dogs 44A to rotate clear of the dogs 45A so that the control sleeve 41A is shifted by the spring 59A to position As. The resulting movement of the pointer 61 indicates to the operator that the supply of driving fluid to the auxiliary turbine 62 should be interrupted and that to the main turbine restored. When this has been done, the resulting de-energising of the fluid motor 66 allows the abutment 64 to be depressed. The ahead control sleeve 41 is consequently shifted by the spring 59 to position As (Figs. 6 and 10). The astern nut 33A now moves to its second position, in which its teeth 35A are in mesh with the jaw clutch teeth 36A of the astern pinion and beyond which it is prevented from moving by the flanking engagement of the dogs 44A and 45A which now co-operate in the same way as did the dogs 44 and 45 when the head coupling was in the condition shown in Fig. 7. The restoration of the supply of driving fluid to the main turbine 20 causes the propeller shaft 32 to be arrested and thereafter rotated backwards. At the moment when the propeller begins to rotate backwards, the ahead coupling nut 33 will be moved by the action of the pawls 39 and the teeth 35 and 36 from the first position (Fig. 8) to the third position (Fig. 9). Since the control sleeve 41 has already been shifted to position As (Fig. 10), the nut 33 will overrun the third position and, assisted by the drag due to ratcheting of the pawls 40 on the teeth 36, will enter the fourth position in which the pawls are out of the path of these teeth.

The change from astern to ahead working is made similarly to the change just described, but in the converse sense.

When the system is at rest, the control lever 53 is in the midposition (Fig. 5) and both control sleeves are in position M. Either ahead or astern drive is established as follows. First the auxiliary turbine 62 is energised so as to rotate the shaft 21 backwards, and as a consequence both coupling nuts will be in the first position, with the pawls 39 and 39A ratcheting over the teeth 36 and 36A respectively. The control lever 53 is now moved to the selected position, say ahead as in Fig. 4. The ahead control sleeve 41 therefore moves to position Ah (Fig. 7) and the astern control sleeve 41A to position F. Next the auxiliary turbine is de-energised and the main turbine is energised so that the shaft 21 begins to rotate forwards. This causes the ahead coupling nut 33 to move to the second position in which it is held by the co-operation of the dogs 44 and 45, so that the ahead drive is established, while the astern coupling nut 33A will run through to the fourth position in which it appears in Fig. 1.

Figure 12:
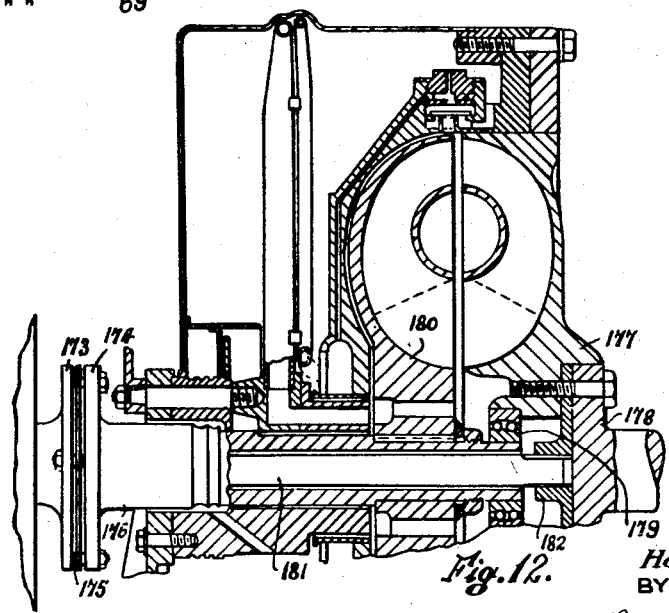
Fig. 12 is a sectional elevation of a coupling connecting the gearing shown in Fig. 11 to the engine.

In a mechanism according to the invention, in which the prime mover is a governed internal-combustion engine, the reversing gearing may be as hereinbefore described, the driving member taking the form of a hollow shaft connected to the runner of a turbo-coupling of the well-known scoop-controlled type fitted with quick-emptying valves, the turbo-coupling impeller being directly connected to the engine crank shaft. Such an arrangement is shown in Figs. 11 and 12. The gearing shown in Fig. 11 is basically the same as that shown in Fig. 1, and parts in Fig. 11 corresponding to parts shown in Fig. 1 are denoted by the same reference numerals plus 100. Preselective shifting means for the control sleeves 141 and 141A are similar to those shown in Fig. 3. In Fig. 11 the driving shaft 121 is hollow and rigid with an input coupling flange 173, forming part of a universal coupling 173, 174 (Fig. 12) of the known type including a flexible ring 175. The flange 174 is integral with a hollow shaft 176 forming the runner shaft of a scoop-controlled hydraulic turbo-coupling of the kind shown in Fig. 4 of patent specification No. 2,187,667. The impeller 177 of this coupling is bolted to a flange 178 on the engine crank shaft and houses a self-aligning bearing 179 supporting the shaft 176 to which the coupling runner 180 is fixed.

An auxiliary drive shaft 181 passes through the hollow shafts 121 and 176 and its front end is splined for engagement with an internally splined hub 182 of a driving ring bolted between the flange 178 and the impeller 177. The rear end of the auxiliary shaft 181 is splined and carries two slidable friction clutch members 183 and 184 co-operating to form a fluid pressure chamber 185. Fluid pressure can be admitted to this chamber through a pipe 186 so as to force the members 183 and 184 apart into frictional engagement with two driven clutch members 187 and 188 forming the body of a gear wheel 189 arranged to drive, through an idler wheel 190, a gear wheel 191 fast on the lay shaft 126. The pipe 186 branches from the pipe 170 leading from the control valve 168 to the cylinder 166 of the motor that actuates the abutment 164 of the control mechanism.

In this case the change from for example ahead to astern is effected by biasing the synchro-couplings as described with reference to the example shown in Figs. 1 to 10, disengaging the main hydraulic turbo-coupling and operating the valve 168 to engage the auxiliary friction clutch. The driving shaft 121 is thereby reversed through the gears 189, 190, 191, 130 and 129, and the astern synchro-coupling is synchronised and engaged, and thereafter the auxiliary friction clutch is disengaged and the main hydraulic turbo-coupling is progressively engaged so that the now backwardly rotating driving shaft 121 is arrested and finally accelerated in the normal direction to drive the main driven gear wheel 131 backwards.

The invention may be applied to turbine driven locomotives with mechanical transmission wherein it is desirable when operating a train on long descending gradients to be able to engage the turbine with the driving wheels of the locomotive through the reverse gear while in forward motion at a moderate operating speed so that the torque of the turbine may be applied to brake the locomotive and relieve the mechanical brakes of the train of undue wear and heating.

I claim:

1. A power-transmission mechanism having a driving member which is capable of exerting substantial driving torque in only a forward direction of rotation, a driven member required to be driven alternatively in the forward and backward directions of rotation at will, gearing providing in parallel between said members a forward-drive power path and a reverse-drive power path, each of said paths having a selecting clutch disengageable for bidirectionally freeing the drives through said paths and engageable for establishing the drives through said paths, auxiliary driving means for rotating said driving member in the reverse direction at a speed of the same order as its normal speed in the forward direction, and control means operable for energising said auxiliary driving means which, while said driven member is running in consequence of engagement of either one of said selecting clutches, and on disengagement of said one clutch, serve to accelerate said driving member in the reverse direction of rotation to a speed sufficient to synchronise the other of said selecting clutches.

2. Mechanism as claimed in claim 1, wherein said driving member is the shaft of a non-reversing elastic fluid turbine, and said auxiliary driving means are a separate motor.

3. Mechanism as claimed in claim 1, wherein said driving member is the shaft of a non-reversing elastic fluid turbine, and said auxiliary driving means are a turbine normally rotated idly backwards and capable of being energised for running in its forward direction while it is being rotated backwards by the driving member.

4. Mechanism as claimed in claim 1, and including a prime mover, and a slip coupling having a driving part connected to said prime mover and a driven part constituting said driving member.

5. Mechanism as claimed in claim 1, and including a prime mover, and a controllable slip coupling having a driving part connected to said prime mover and a driven part constituting said driving member.

6. Mechanism as claimed in claim 1, and including a non-reversible reciprocating internal-combustion engine, and a slip coupling having a driving part connected to the crank shaft of said engine and a driven part constituting said driving member.

7. Mechanism as claimed in claim 1, and including a prime mover, and a slip coupling having a driving part connected to said prime mover and a driven part constituting said driving member, said auxiliary driving means being constituted by a power take-off, including an auxiliary controllable slip coupling, from said prime mover arranged in parallel with the first-mentioned slip coupling.

8. Mechanism as claimed in claim 1, wherein said selecting clutches are of the synchro-self-shifting type having an axially movable intermediate jaw element capable of moving to either side of a position in which it is engaged with a second jaw element, two sets of synchronising pawls which serve to mesh said intermediate jaw element cleanly with said second jaw element when moved from the two sides respectively, and a controllable stop member operable to prevent said intermediate element from moving beyond the engaged position when the driving part of the clutch tends to rotate forwards relatively to its driven part.

9. Mechanism as claimed in claim 1, wherein said selecting clutches are of the synchro-self-shifting type having an axially movable intermediate jaw element capable of moving to either side of a position in which it is engaged with a second jaw element, two sets of synchronising pawls which serve to mesh said intermediate jaw element cleanly with said second jaw element when moved from the two sides respectively, and a controllable stop member operable to prevent said intermediate element from moving beyond the engaged position when the driving part of the clutch tends to rotate forwards relatively to its driven part, each of said intermediate elements being capable of moving, in response to forward rotation of the driving part of the clutch relative to its driven part, to a disengaged position such that both sets of pawls are inoperative, and the mechanism also including control means for shifting each of said intermediate elements from said disengaged position to a position in which the appropriate one of said sets of pawls is operative.

10. A power-transmission mechanism having a driving member which is capable of exerting substantial driving torque in only a forward direction of rotation, a driven member required to be driven alternatively in the forward and backward directions of rotation at will, gearing providing in parallel between said members a forward-drive power path and a reverse-drive power path, said paths having respectively two controllable selecting clutches for establishing the drives through said paths, each of said clutches in an inoperative condition permitting relative rotation of its driving and driven parts in both directions, and in an operative condition transmitting forward rotation from its driving part to its driven part, control means operable for biasing said clutches alternatively towards the operative condition, auxiliary driving means for rotating said driving member in the reverse direction, and control means operable for energising said auxiliary driving means which, while said driven member is running, serve to accelerate said driving member in the reverse direction to a speed sufficient to synchronise the one of said clutches that was previously inoperative.

11. A power-transmission mechanism including a main turbine capable of exerting substantial driving torque in only a forward direction of rotation, a driven member required to be driven alternatively in the forward and backward directions of rotation at will, gearing providing in parallel between said turbine and said driven member a forward-drive power path and a reverse-drive power path, said paths having respectively two controllable selecting clutches for establishing the drives through said paths, each of said clutches in an inoperative condition permitting relative rotation of its driving and driven parts in both directions, and in an operative condition transmitting forward rotation from its driving part to its driven part, control means operable for biasing said clutches alternatively towards the operative condition, an auxiliary motor operable for rotating said turbine in the reverse direction, and control means operable for energising said auxiliary motor and thereby causing, while said driven member is running, said turbine to be accelerated in the reverse direction to a speed sufficient to synchronise the one of said clutches that was previously inoperative.

12. A power-transmission mechanism including a non-reversing motor, a main slip coupling having a driving part connected to said motor and a driven part, a driven member required to be driven alternatively in the forward and backward directions of rotation at will, gearing providing in parallel between said driven part and said driven member a forward-drive power path and a reverse-drive power path, said paths having respectively two controllable selecting clutches for establishing the drives through said paths, each of said clutches in an inoperative condition permitting relative rotation of its driving and driven parts in both directions, and in an operative condition transmitting forward rotation from its driving part to its driven part, control means operable for biasing said clutches alternatively towards the operative condition, a reverse-drive power take-off, including an auxiliary controllable slip coupling, between said motor and the driven part of said main slip coupling, and control means operable for biasing said selecting clutches alternatively towards the operative condition.

HAROLD SINCLAIR.

REFERENCES CITED

The following references are of record in the file of this patent:

UNITED STATES PATENTS

| Number | Name | Date |
|---|---|---|
| 1,577,101 | Beitzell | Mar. 16, 1926 |
| 1,677,026 | Buckland | July 10, 1928 |
| 2,197,179 | Hersey | Apr. 16, 1940 |
| 2,202,271 | Sinclair | May 28, 1940 |
| 2,252,042 | Sinclair | Aug. 12, 1941 |
| 2,459,361 | Carnagua | Jan. 18, 1949 |

FOREIGN PATENTS

| Number | Country | Date |
|---|---|---|
| 171,030 | Great Britain | Nov. 10, 1921 |
| 396,622 | Great Britain | Aug. 10, 1933 |
| 498,893 | Great Britain | Jan. 16, 1939 |